(12) United States Patent
Iwamoto

(10) Patent No.: US 10,904,018 B2
(45) Date of Patent: Jan. 26, 2021

(54) INFORMATION-PROCESSING SYSTEM, INFORMATION-PROCESSING APPARATUS, INFORMATION-PROCESSING METHOD, AND PROGRAM

(71) Applicant: NINTENDO CO., LTD., Kyoto (JP)

(72) Inventor: Daiki Iwamoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 845 days.

(21) Appl. No.: 13/764,079

(22) Filed: Feb. 11, 2013

(65) Prior Publication Data

US 2013/0325956 A1 Dec. 5, 2013

(30) Foreign Application Priority Data

Jun. 1, 2012 (JP) ................................. 2012-125826

(51) Int. Cl.
| | |
|---|---|
| A63F 13/52 | (2014.01) |
| H04L 12/00 | (2006.01) |
| A63F 13/30 | (2014.01) |
| H04L 12/58 | (2006.01) |

(52) U.S. Cl.
CPC .............. *H04L 12/00* (2013.01); *A63F 13/12* (2013.01); *A63F 13/52* (2014.09); *H04L 51/32* (2013.01); *A63F 2300/5593* (2013.01); *A63F 2300/572* (2013.01)

(58) Field of Classification Search
CPC .......... H04L 29/08081; H04L 29/0809; H04L 29/08126; H04L 29/08117; H04L 29/08153; H04L 29/08198
USPC .... 463/42, 30; 709/204, 217, 224, 206, 203, 709/219; 725/39, 10
See application file for complete search history.

(56) References Cited

U.S. PATENT DOCUMENTS

| | | | | |
|---|---|---|---|---|
| 6,025,801 | A | * | 2/2000 | Beitel .................... A63F 13/12 342/457 |
| 8,938,493 | B2 | * | 1/2015 | Kawakami et al. .......... 709/203 |
| 2005/0003850 | A1 | * | 1/2005 | Tsuda ................ H04M 1/72522 455/550.1 |
| 2007/0052712 | A1 | * | 3/2007 | Saito ................... A63F 13/2145 345/473 |
| 2009/0131177 | A1 | | 5/2009 | Pearce |
| 2009/0209335 | A1 | | 8/2009 | Pearce |

(Continued)

FOREIGN PATENT DOCUMENTS

JP 2010-517186 5/2010

OTHER PUBLICATIONS

"Xbox LIVE Connects You", http://www.xbox.com/ja-JP/live-stayconnected, and its English counterpart, 3 pages.

*Primary Examiner* — Dhairya A Patel
(74) *Attorney, Agent, or Firm* — Nixon & Vanderhye PC

(57) ABSTRACT

An exemplary information-processing system includes: an execution unit configured to execute an application program; a prompting unit configured to prompt a user to post to a service for sharing posted information, in response to a predetermined condition being satisfied a predetermined number of times in the application program executed by the execution unit; and a posting unit configured to post posted information corresponding to the predetermined condition to the service in accordance with a user input with respect to the prompting unit.

15 Claims, 5 Drawing Sheets

(56) References Cited

U.S. PATENT DOCUMENTS

| | | | |
|---|---|---|---|
| 2010/0146097 A1* | 6/2010 | Yoshida | H04L 67/14 709/223 |
| 2010/0250617 A1* | 9/2010 | Aihara | G06F 16/51 707/802 |
| 2011/0106912 A1* | 5/2011 | Onda | A63F 13/497 709/217 |
| 2011/0153734 A1* | 6/2011 | Kawakami | A63F 13/358 709/203 |
| 2011/0275442 A1* | 11/2011 | Hawkins, III | G06Q 10/00 463/42 |
| 2011/0304584 A1* | 12/2011 | Hwang | G06F 3/04845 345/174 |
| 2011/0319148 A1* | 12/2011 | Kinnebrew et al. | 463/1 |
| 2012/0015722 A1* | 1/2012 | Mooney et al. | 463/30 |
| 2013/0157762 A1* | 6/2013 | Yamaguchi | A63F 13/822 463/31 |
| 2014/0129949 A1* | 5/2014 | Singer | H04W 4/021 715/733 |
| 2014/0342826 A1 | 11/2014 | Pearce | |
| 2015/0174492 A1 | 6/2015 | Pearce | |
| 2016/0045832 A1 | 2/2016 | Pearce | |

* cited by examiner

| TIME OF MISTAKE | LOCATION |
|---|---|
| IMMEDIATELY PREVIOUS | X1, Y1 |
| SECOND PREVIOUS | X2, Y2 |
| THIRD PREVIOUS | X3, Y3 |

INFORMATION-PROCESSING SYSTEM, INFORMATION-PROCESSING APPARATUS, INFORMATION-PROCESSING METHOD, AND PROGRAM

CROSS REFERENCE TO RELATED APPLICATIONS

This application is based on and claims priorities under 35 USC 119 from Japanese patent application No. 2012-125826, which was filed on Jun. 1, 2012.

FIELD

The present disclosure relates to techniques for accessing services for sharing posted information.

BACKGROUND AND SUMMARY

Information-processing apparatuses whose users can communicate with other users using a communication function are known.

The present disclosure provides a technique for further enlivening communication with other users.

There is provided an information-processing system including: an execution unit configured to execute an application program; a prompting unit configured to prompt a user to post to a service for sharing posted information, in response to a predetermined condition being satisfied a predetermined number of times in the application program executed by the execution unit; and a posting unit configured to post posted information corresponding to the predetermined condition to the service in accordance with a user input with respect to the prompting unit.

BRIEF DESCRIPTION OF THE DRAWINGS

Exemplary embodiments will be described with reference to the following drawings, wherein.

DETAILED DESCRIPTION OF NON-LIMITING EXEMPLARY EMBODIMENTS

1. Configuration

Figure 1:
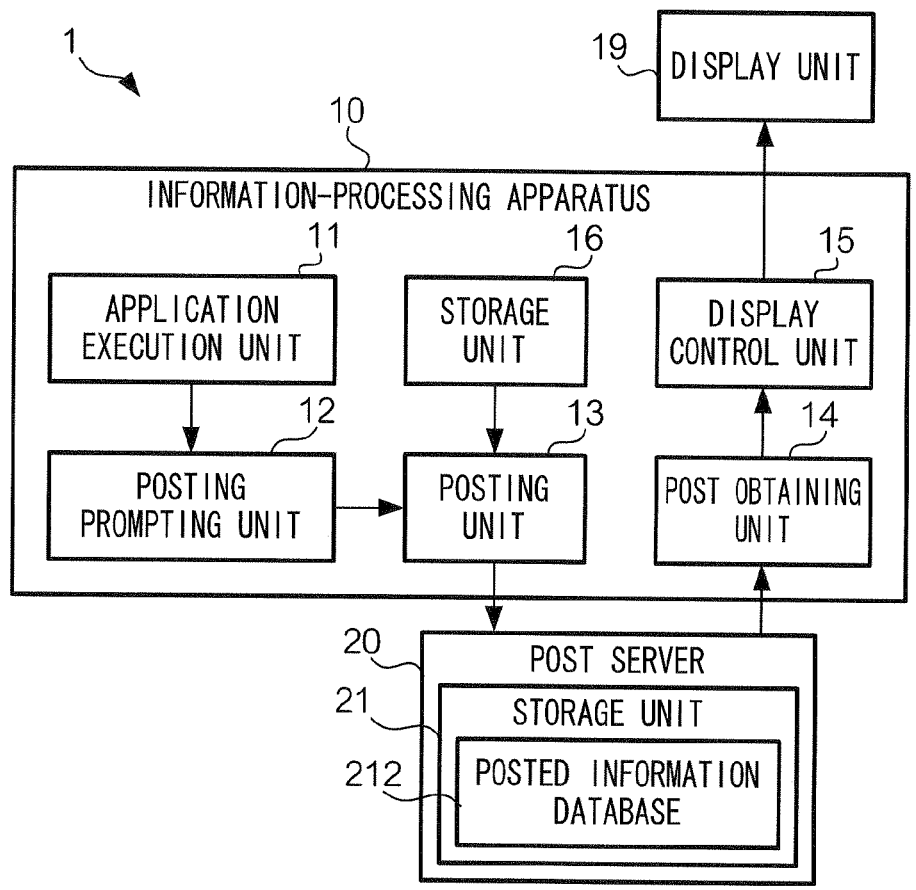
FIG. 1 shows an example of a functional configuration of information-processing system 1 according to one embodiment.

FIG. 1 is a block diagram showing a functional configuration of information-processing system 1 according to one embodiment. Information-processing system 1 includes plural information-processing apparatuses 10 and post server 20. FIG. 1 only shows one information-processing apparatus 10 for the sake of simplification. Post server 20 is a server device for providing a community (e.g., a bulletin board) in a network. In the community, posted information from each information-processing apparatus 10 is transmitted to post server 20. Post server 20 includes storage unit 21. Storage unit 21 stores posted information database 212. Posted information database 212 is a database that accumulates posted information. Post server 20 provides, according to a request from a specific information-processing apparatus 10, the posted information accumulated in posted information database 212 to information-processing apparatus 10 that is the source of the request. The posted information includes character strings (text), handwritten characters, or images as an opinion, an impression, a question, a comment, or a message (hereinafter simply referred to as "a text" as needed) input by a user. In other words, the user of information-processing apparatus 10 can view texts or messages of other users, release (post) his or her own texts or messages, and exchange messages with other users through this community.

Note that a community is one example of a service for sharing posted information. Posted information may alternatively be provided by a service other than a community, for example, by a so-called review site, or a blog. In this example, one service has plural communities corresponding to plural application programs, but the service for sharing posted information itself may be categorized for each application program. For example, a community may be provided for application program A, while a review site may be provided for application program B.

Information-processing apparatus 10 includes application execution unit 11, posting prompting unit 12, posting unit 13, post obtaining unit 14, display control unit 15, and storage unit 16. Application execution unit 11 executes an application program (software). In this example, the application program is, for example, a program (e.g., a game program) for executing plural events that proceed in at least one of virtual time and virtual space. Further, the application program may also be a program for moving a virtual object on a two-dimensional space shown on a screen according to an input by a user. Posting prompting unit 12 prompts a user to post a text to the community in response to a predetermined condition being satisfied a predetermined number of times in the application program executed by application execution unit 11. The condition used here is, for example, an event (hereinafter referred to as a "target event") that occurs a predetermined number of times within a predetermined time period in virtual time or within a predetermined range in virtual space in the application program executed by application execution unit 11. Posting unit 13 posts posted information corresponding to the above-mentioned predetermined condition to the community according to a user input with respect to posting prompting unit 12.

Post obtaining unit 14 obtains, from post server 20, at least one item of posted information from other users. If the target event occurs, display control unit 15 controls display unit 19 to display posted information corresponding to the target event out of at least one item of posted information obtained by post obtaining unit 14, at a time or at a location corresponding to the target event. Storage unit 16 stores a user image corresponding to the user of this information-processing apparatus 10. Display unit 19 displays the posted information which is in the form of at least one of characters and images (handwritten images).

Figure 2:
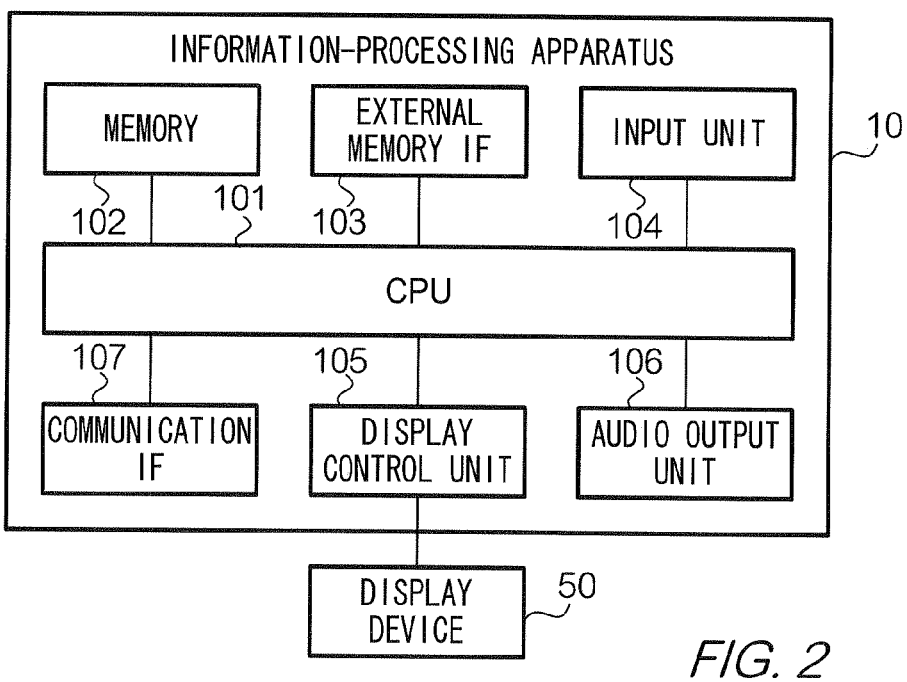
FIG. 2 shows an example of a hardware configuration of information-processing apparatus 10.

FIG. 2 is a diagram showing a hardware configuration of information-processing apparatus 10. In this example, information-processing apparatus 10 is a game device for executing a video game. Information-processing apparatus 10 is a computer device having CPU (Central Processing Unit) 101, memory 102, external memory IF 103, input module 104, display controller 105, sound module 106, and communication IF 107. Information-processing apparatus 10 is connected to display device 50. Display device 50 is a device that displays information which is in the form of images, characters, and the like, and includes a display (a liquid-crystal panel, an organic EL (Electro-Luminescence) panel, or the like) and a drive circuit. In this example, information-processing apparatus 10 is a so-called console-type game device and does not include display device 50. Display device 50 is an external device, such as a television receiver. Note that information-processing apparatus 10 may include display device 50.

CPU 101 is a device that controls each component of information-processing apparatus 10, and performs various calculations. Memory 102 is a storage device that stores programs and data, and includes a RAM (Random Access Memory) and a ROM (Read Only Memory), for example. External memory IF 103 is an interface that reads and writes programs and data from/to a storage medium (e.g., an optical disk, a magnetic disk, or a semiconductor memory) storing the programs and data. Input module 104 is an input device that inputs an instruction or a command from the user to CPU 101, and includes a keypad, buttons, a touch screen, or a microphone, for example. Display controller 105 is a device that controls information in the form of images or characters to be displayed on the display device, and includes an image processing circuit and a video signal output circuit, for example. Sound module 106 is a device that outputs an audio signal, and includes an audio processing circuit and an audio signal output circuit, for example. Communication IF 107 is a device that performs communication via a wired or wireless network (e.g., the Internet) according to a predetermined communication standard.

Figure 3:
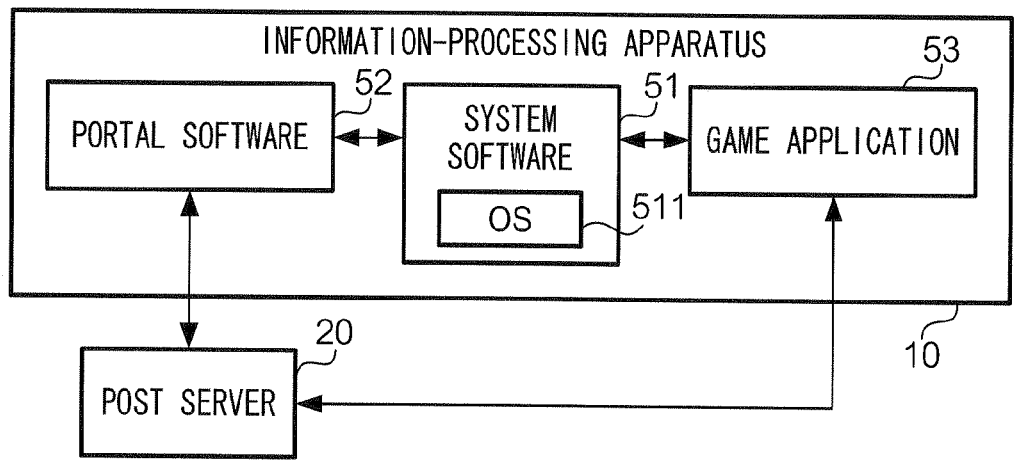
FIG. 3 shows an example of a software configuration of information-processing apparatus 10.

FIG. 3 is a diagram showing a software configuration of information-processing apparatus 10. Information-processing apparatus 10 includes system software 51, portal software 52, and game application 53.

System software 51 is software for managing or controlling information-processing apparatus 10. System software 51 is software that is essential for executing various application programs in information-processing apparatus 10 and always exists in information-processing apparatus 10 at the time of execution of application programs. In this example, system software 51 includes OS (Operating System) 511. OS 511 is basic software for operating application programs including portal software 52 and game application 53.

Portal software 52 is client software for an information sharing service (such as an internet community or an electronic bulletin board), and provides a user interface for browsing posted information to the user and receiving an input of posted information by the user. Portal software 52 transmits a request to post server 20, and controls a community screen to be displayed in accordance with data transmitted from post server 20 according to the request. The community screen includes at least one item of posted information from one or more users, and a UI (User Interface) for inputting and transmitting the posted information.

Note that if plural users share information-processing apparatus 10, the one active user is specified based on a so-called login process.

Game application 53 is an application program (software) for causing information-processing apparatus 10 to execute a video game. Information-processing apparatus 10 is able to execute various kinds of game application 53. A program for implementing game application 53 is stored in, for example, a storage medium (external memory). The user inputs an instruction to information-processing apparatus 10 to execute a desired game application 53 by causing information-processing apparatus 10 to read the program stored in a desired storage medium among plural storage media that store different programs. In another example, plural programs are stored in memory 102, and the user inputs an instruction to information-processing apparatus 10 to execute a desired game application 53 by starting a desired program among those programs.

In the present embodiment, system software 51 and portal software 52 are stored in advance in memory 102 at the time of sale of the information-processing apparatus. In other words, system software 51 and portal software 52 are provided as functions on the platform of information-processing apparatus 10. Game application 53 is stored in an external memory. Note that game application 53 may be stored in memory 102. Further, at least one of system software 51, portal software 52, and game application 53 may be provided by download via a network, rather than being stored in advance at the time of sale of the information-processing apparatus, and may be updated to the latest version through network update.

CPU 101 is an example of application execution unit 11. CPU 101, when executing game application 53, is an example of posting prompting unit 12 and display control unit 15. CPU 101, when executing portal software 52, is an example of posting unit 13 and post obtaining unit 14. Note that CPU 101, when executing game application 53, may be an example of posting unit 13 and post obtaining unit 14, and CPU 101, when executing portal software 52, may be an example of display control unit 15. Memory 102 and the external memory are examples of storage unit 16. Display device 50 is an example of display unit 19.

2. Operation

In information-processing system 1, processing for posting posted information and processing for displaying posted information are performed as the game proceeds. Hereinafter, the above-mentioned processing will be described in order. The software such as game application 53 will be hereinafter described as the agent of the processing, which means that CPU 101, when executing game application 53, performs the processing in cooperation with other hardware.

2-1. Posting of Posted Information

Figure 4:
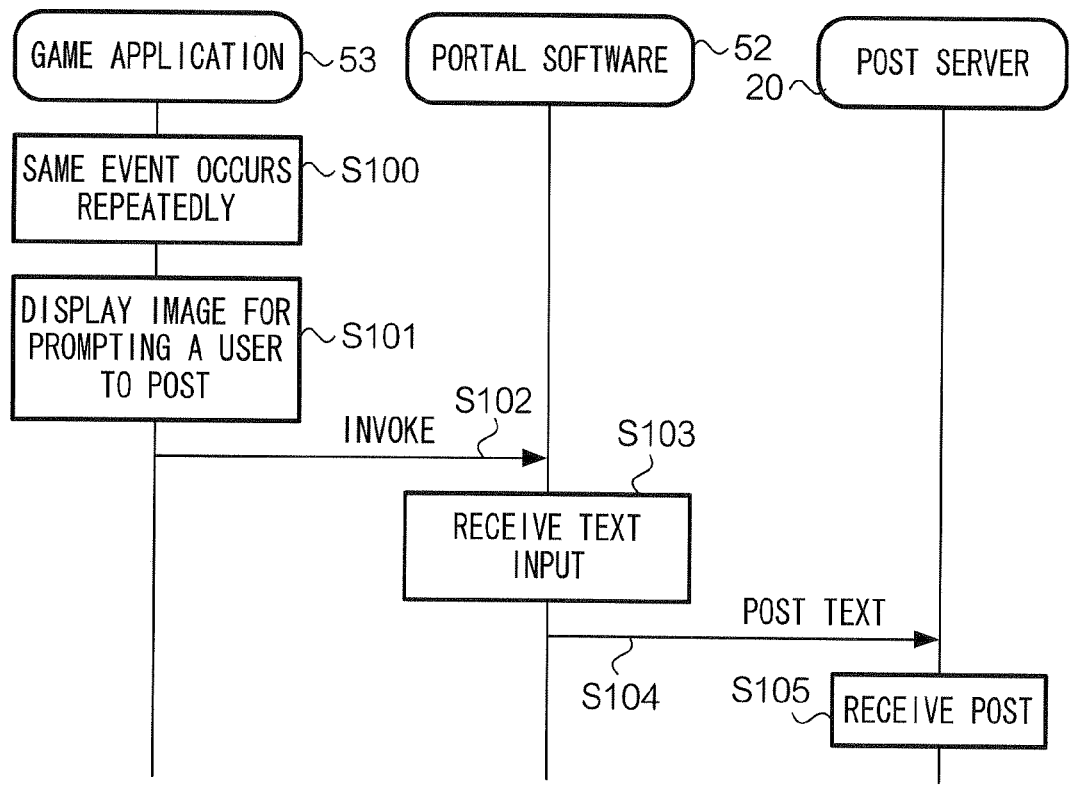
FIG. 4 shows an example of a sequence chart illustrating processing for posting posted information.

FIG. 4 is a sequence chart illustrating processing for posting posted information. Game application 53 is started before the start of this sequence chart.

Figure 5A:
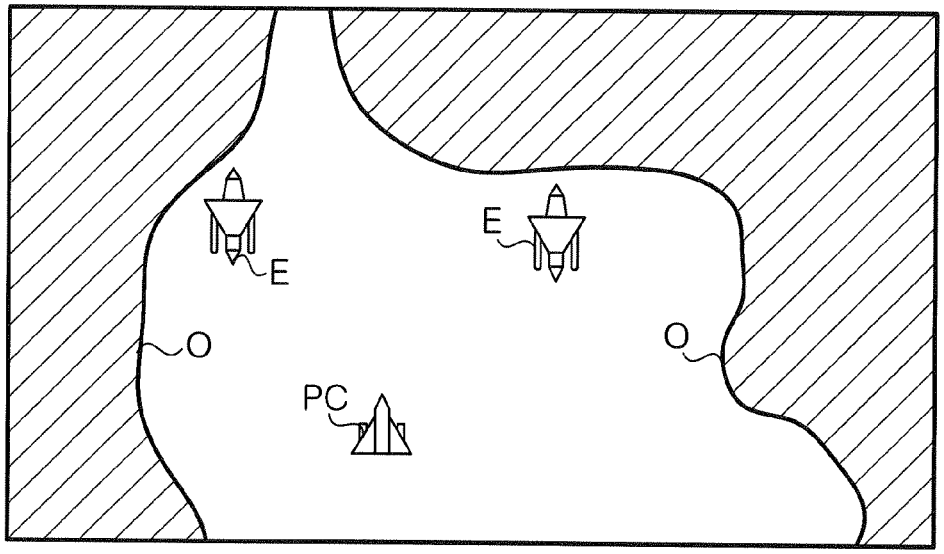
FIGS. 5A and 5B show an example of images of game application 53.
Figure 5B:
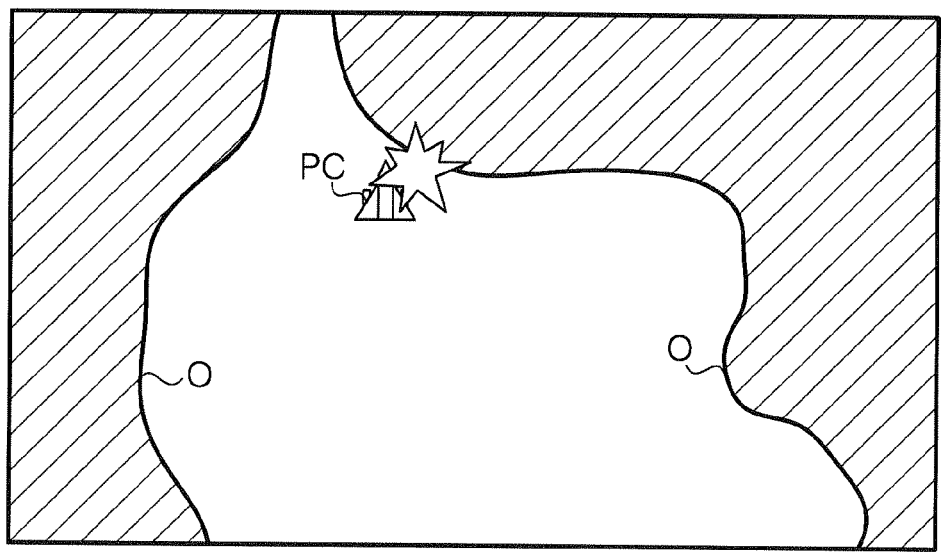

FIGS. 5A and 5B are diagrams showing exemplary images (screens) displayed in accordance with game application 53. In this example, game application 53 is a scrolling shooting game. The following description will be given using an example of game application 53 which is a game in which the user operates fighter plane PC that moves in virtual space and shoots down enemy planes E while avoiding obstacle O.

Referring again to FIG. 4, in step S100, game application 53 determines whether or not the same event (hereinafter referred to as a "target event") has occurred repeatedly a predetermined number of times (e.g., three times) at the same location. In other words, game application 53 determines whether or not a predetermined condition has been satisfied repeatedly a predetermined number of times. The target event is, for example, an event of losing fighter plane PC, such as an event of fighter plane PC being shot down by enemy plane E, or an event of fighter plane PC colliding with (being downed by) obstacle O. FIG. 5B shows an exemplary displayed image at the time of fighter plane PC colliding with obstacle O. Hereinafter, fighter plane PC being shot down by enemy plane E and fighter plane PC colliding with obstacle O will be simply referred to as "the user made a mistake". In game application 53, the user has n fighter planes PC (n≥1). If an event of losing fighter plane PC occurs, the number of fighter planes PC that the user has (hereinafter referred to as "remaining aircrafts") decreases. If fighter plane PC is lost again in a state where the number of remaining aircrafts is zero, it is game-over.

In this example, game application 53 executes processing for moving fighter plane PC according to inputs by a user, moving enemy plane E using a predetermined algorithm, and drawing the trajectory of bullets shot by fighter plane PC or enemy plane E, and holds the situation in which the target event occurred for a predetermined number of times (e.g., three times) (specifically, stores the state in memory 102), for example.

Figures 6, 7:
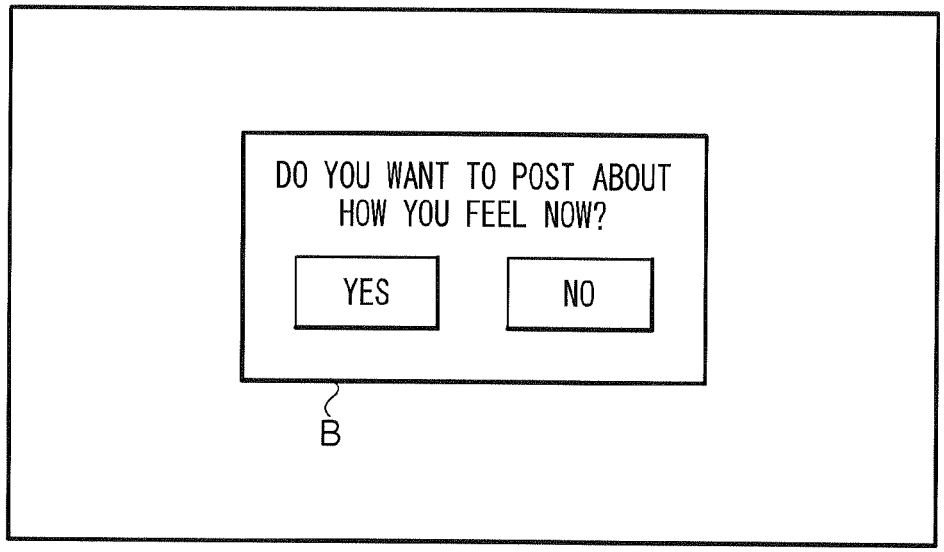
FIG. 6 shows an example of data held by the game application.
FIG. 7 shows an example of image displayed in step S101.

FIG. 6 is a diagram showing exemplary data held by the game application. In this example, the respective locations where the user made a mistake (immediately previous mistake, second previous mistake, and third previous mistake) are recorded. The locations recorded in this example are coordinates in virtual space which change as the game proceeds, and indicate locations in virtual space where the user made a mistake. Alternatively, plural locations corresponding to events may be set in advance in virtual space, and an event location closest to the location where the user made a mistake may be indicated.

If the user made a mistake, game application 53 stores, in memory 102, coordinates indicating the location in virtual space where the user made a mistake. Next, game application 53 determines whether or not this mistake occurred at the same location. Here, "the same location" indicates not only the exact same location but also an area within a certain range from a predetermined location. For example, three locations where the user made mistakes are recorded in the example of FIG. 6. If all these locations are within the above-mentioned area, it is determined that the three mistakes occurred at the same location. If it is determined that the three mistakes occurred at the same location, game application 53 advances the processing to step S101. If it is determined that the three mistakes did not occur at the same location, game application 53 continues the game processing.

Referring again to FIG. 4, in step S101, game application 53 displays an image for prompting a user to post a text.

FIG. 7 is a diagram showing an exemplary image displayed in step S101. In this example, dialog box B is displayed after the image of FIG. 5B. Dialog box B includes a message saying "Do you want to post about how you feel now?", a "YES" button for giving an instruction to make a post, and a "NO" button for giving an instruction not to make a post. If the user presses the "YES" button on this image, the game application advances the processing to step S102. If the user presses the "NO" button, game application 53 returns to the game processing.

Referring again to FIG. 4, in step S102, game application 53 invokes portal software 52. In this example, a text is input via portal software 52. Note that the text may be input by game application 53.

In step S103, portal software 52 receives the text input. Specifically, portal software 52 displays an image for inputting a text (hereinafter referred to as "text input image"). The text input image includes, for example, a software keyboard and a text box in which an input character string is displayed. Alternatively, the text input image may have a drawing area for inputting handwritten characters (image) as a text. In this case, input module 104 includes a touch screen or a pointing device. If the user gives an instruction to post a text after inputting the text, the game application 52 advances the processing to step S104.

In step S104, portal software 52 transmits the posted information including the input text to post server 20. The posted information transmitted to post server 20 includes attribute information and additional information on the text, as well as the text input in step S103. The attribute information is, for example, a user name of the user that inputted the text, a user image (e.g., an avatar), a timestamp indicating the date and time when the text was input, and information for identifying the application program (game application 53 in this example) relating to the text. The additional information is information indicating the location where the mistake that triggered input of the text occurred, such as coordinates in virtual space, for example. The attribute information is held by OS 511, and portal software 52 obtains the attribute information from OS 511. The additional information is held by game application 53, and portal software 52 obtains the additional information from game application 53.

In step S105, post server 20 receives the post. Specifically, post server 20 registers the posted information transmitted from information-processing apparatus 10 in posted information database 212.

2-2. Display of Posted Information

Figure 8:
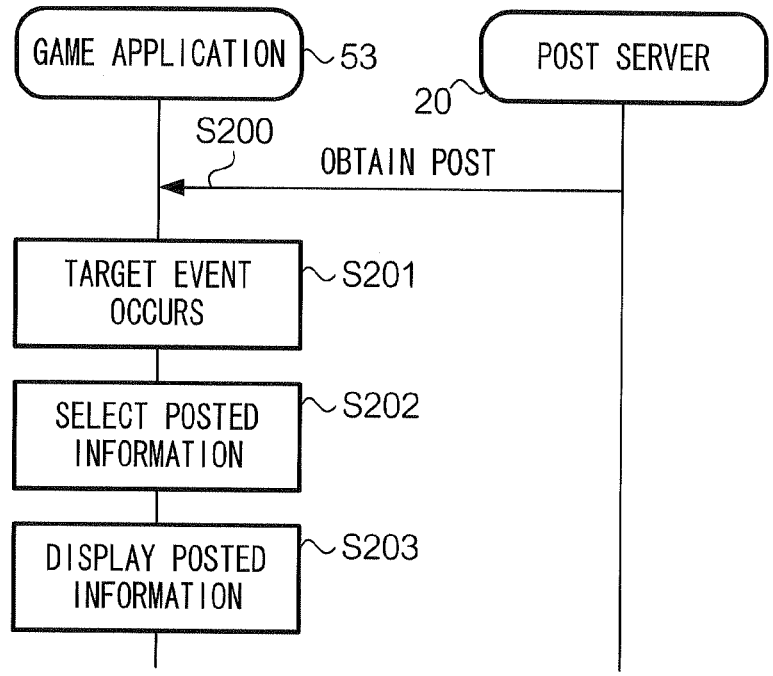
FIG. 8 shows an example of a sequence chart illustrating processing for posting posted information.

FIG. 8 is a sequence chart illustrating processing for posting posted information. Game application 53 is started before the start of this sequence chart.

In step S200, game application 53 obtains the posted information from post server 20. Game application 53 obtains items of posted information that satisfy a predetermined condition from among the posted information registered in posted information database 212 (e.g., ten items in reverse chronological order of the timestamp from among the posted information relating to the game application). Alternatively, game application 53 obtains all items of posted information relating to the application from the posted information registered in posted information database 212. Specifically, game application 53 may obtain the posted information at any time. For example, system software 51 or portal software 52 may obtain the posted information from post server 20 before execution of game application 53. In another example, game application 53 may obtain the posted information from post server 20 when the above-mentioned target event occurred. In still another example, game application 53 may obtain the posted information from post server 20 when an event other than the above-mentioned target event occurred (e.g., when the user cleared a stage).

The target event occurs in game application 53 (step S201). At this time, game application 53 obtains the coordinates where the target event occurred in virtual space. In step S202, game application 53 selects posted information to be displayed from among the obtained posted information. The number of items of posted information displayed on a single image is determined in advance (e.g., two items). Game application 53 selects the posted information to be displayed in accordance with a predetermined rule. For example, this rule is that the location indicated by the additional information coincides with the location indicated by the coordinates obtained in step S201, or is within a predetermined range therefrom. In other words, the text made at the time of mistake at the same location is selected.

Further, in addition to this rule, a rule may also be used that posted information posted by a user satisfying a predetermined condition (e.g., a user who is a friend) is displayed in preference to posted information posted by other users (if there is no posted information of a user who is a friend, posted information of a user who is not a friend may be displayed), for example. Note that a "friend" refers to a relationship between users that mutually agreed to be friends in an information sharing service or the like.

In step S203, game application 53 displays the selected posted information. At this time, the posted information may be displayed at a location corresponding to the target event. Posting of a text is performed when a mistake occurred repeatedly a predetermined number of times at the same location. Meanwhile, in this example, display of a text is performed at the time of the first mistake.

Figure 9:
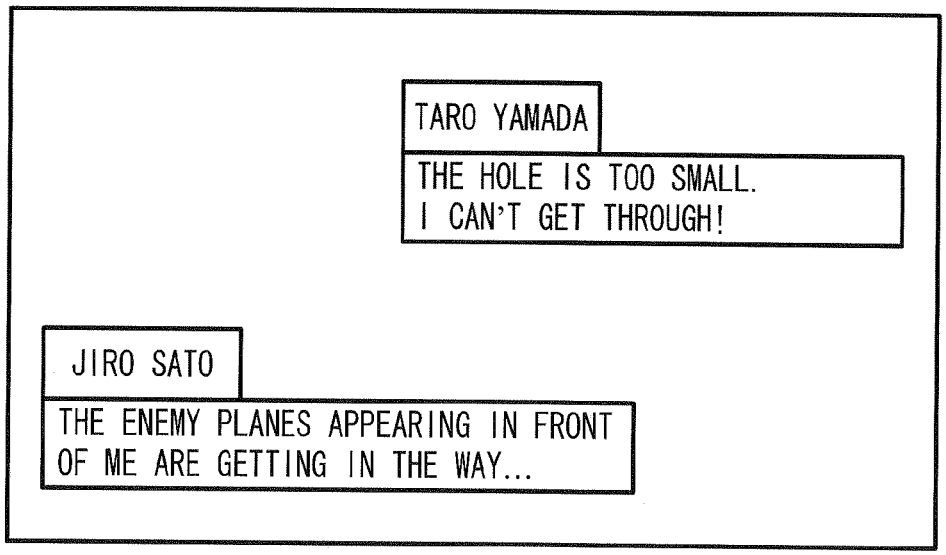
FIG. 9 shows an example of displayed posted information.

FIG. 9 is a diagram showing an example of displayed posted information. Here, two items of posted information are displayed. In this example, text and user names in the posted information are displayed, but the information to be displayed is not limited thereto.

With information-processing system 1, posting is prompted when a certain event (a predetermined condition) occurred repeatedly a predetermined number of times in game application 53. Accordingly, it is possible to prompt even users that are not in the habit of making a post to a community or the like to make a post to the community. Further, in information-processing system 1, posting to the community is prompted when a certain event occurred repeatedly a predetermined number of times. If the same event occurred repeatedly a predetermined number of times, users often get excited. For example, the user that made several mistakes at the same location often feels like venting his or her feelings at someone. Accordingly, by prompting posting to the community, such feelings of the user can be catered for, and it is hoped to enliven the community.

3. Modifications

The technology is not restricted to the embodiment described above. Various modifications can be applied to the exemplary embodiment. Some modifications will be described below. Two or more modifications from among the following modifications may be combined.

3-1. Modification 1

In the above embodiment, a description was given of an example where posting to the community is prompted if the target event occurred repeatedly a predetermined number of times within a predetermined range in virtual space. However, the event that triggers prompting to make a post to the community is not limited to the example described in the embodiment. For example, game application 53 may prompt posting to the community if the target event occurred repeatedly a predetermined number of times within a predetermined time period in virtual time that proceeds in game application 53. In short, game application 53 may be a program for executing plural events that proceed in at least one of virtual time or virtual space.

3-2. Modification 2

Game application 53 may include an event relating to plural virtual objects (e.g., plural enemy characters). In this case, game application 53 may prompt posting to the service for sharing posted information if an event relating to a virtual object occurred repeatedly a predetermined number of times (e.g., if the user was beaten repeatedly a predetermined number of times by the same enemy character).

3-3. Modification 3

In the above embodiment, a description was given of an example where posting to the community is prompted if the target event occurred repeatedly a predetermined number of times. In other words, in the above-described example, the target event need only occur repeatedly the predetermined number of times, and does not have to occur successively. However, this need not be the case. For example, posting may be prompted if the target event occurred successively a predetermined number of times.

3-4. Modification 4

The time when posted information is displayed is not limited to that described in the embodiment. For example, posted information may be selected at the time corresponding to an event other than the target event, such as at the time of selecting a stage. If posted information corresponding to the target event is displayed on a stage selection image, the posted information may be displayed in association with the position of the stage corresponding to the target event. Further, even if posted information is displayed at the time corresponding to the target event, the posted information may be displayed if the target event occurred repeatedly (or successively) a predetermined number of times (this predetermined number of times may be different from the predetermined number of times applied to text posting).

3-5. Modification 5

The attributed information included in the posted information is not limited to that described in the embodiment. The attribute information may include information that designates a facial expression of a user image (e.g., so-called avatar image), for example. In this case, game application 53 may display the designated facial expression as the user image when displaying the posted information.

3-6. Modification 6

If the posted information is posted for a certain event, the data concerning a mistake location shown as an example in FIG. 6 may be reset (deleted). In other words, after one post is made, posting will next be prompted when another mistake is repeated the predetermined number of times. Alternatively, after one post is made in association with a location, a flag for inhibiting prompting may be set so that posting is not prompted at this location. In this case, game application 53 does not prompt posting at the location for which the flag for inhibiting prompting is set.

3-7. Further Modifications

The software configuration of information-processing apparatus 10 is not limited to that described in the embodiment. For example, game application 53 may function as a client of the information sharing service. In this case, texts may be posted and viewed not from portal software 52 but from game application 53.

Information-processing apparatus 10 is not limited to a console-type game device. Information-processing apparatus 10 may alternatively be a portable game device, or an information-processing apparatus other than a game device, such as a personal computer, a mobile phone, a PDA (Personal Digital Assistant), or a tablet terminal. Further, the application program executed in information-processing apparatus 10 is not limited to a game application. An application program for implementing a function other than a game, such as a document editing application, a learning application, or other practical software, may be executed in information-processing apparatus 10.

The hardware configuration of information-processing apparatus 10 is not limited to that described in FIG. 2. An apparatus having any hardware configuration capable of implementing the functions described in FIG. 1 may be used.

The sequence chart described in the embodiment is only an example, and the order of the processes is not limited to that shown as an example in the sequence chart.

The apparatus configuration and allocation of the functions to the devices in information-processing system 1 are not limited to those described in the embodiment. For example, at least part of the functions of information-processing apparatus 10 described in the embodiment may be possessed by a server. In this case, the units in the information-processing system are implemented by processing performed by the processor of the information-processing apparatus, processing performed by the processor of the server, or cooperative processing performed by the processors of the information-processing apparatus and the server. Allocation of the processes may be designed as appropriate based on technical common sense of a person skilled in the art. Further, the server in this information-processing system may be the same apparatus as, or different from, the post server 20.

The application program executed by information-processing apparatus 10 is not limited to that provided by the recording medium. The application program may alternatively be provided by download via a network such as the Internet. Further, system software of information-processing apparatus 10 may be provided by the recording medium or by means of downloading.

What is claimed is:

1. An information-processing system comprising:
    a non-transitory computer readable medium for storing instructions; and
    a processing system, including a processor, the processing system upon executing the instructions providing functionality comprising:
        an execution to execute an application program;
        a prompting to prompt a user to post to a service for sharing posted information, in response to a repeated mistake or failure being made by a virtual character operated by the user at a same location in virtual space for a predetermined plural number of times in the executed application program; and
        a posting to post posted information corresponding to the repeated mistake or failure to the service in accordance with a user input with respect to the prompting,
    wherein the execution stores coordinates indicating the same location in the virtual space respectively at different times where the repeated mistake or failure is made by the user at the same location in the virtual space for the predetermined plural number of times; and
    wherein the prompting prompts the user to post to the service for sharing posted information upon determination that the user has made the repeated mistake or failure at the same location in the virtual space for the predetermined plural number of times.

2. The information-processing system according to claim 1, wherein
    the application program is a program for executing a plurality of events that proceed in a virtual time, and
    the prompting prompts the user to post to the service for sharing posted information, if the user has made the repeated mistake or failure at the same location in the virtual space for the predetermined plural number of times within a predetermined time period in the virtual time in the executed application program.

3. The information-processing system according to claim 1, wherein
    the application program includes an event relating to a plurality of virtual objects, and
    the prompting prompts the user to post to the service for sharing posted information if an event relating to one virtual object occurs the predetermined plural number of times in the executed application program.

4. The information-processing system according to claim 1, the functionality further comprising
    an obtaining to obtain, from the service, posted information from another user; and
    a display control to control display of the obtained posted information when the user has made the repeated mistake or failure at the same location in the virtual space for the predetermined plural number of times.

5. The information-processing system according to claim 1, wherein
    the obtaining obtains posted information corresponding to each of a plurality of events, and
    if an one event occurs, a display control controls display of the posted information corresponding to the one event.

6. The information-processing system according to claim 5, wherein
    the display control displays information from the user who has made the repeated mistake or failure at the same location in the virtual space for the predetermined plural number of times, out of the obtained posted information.

7. The information-processing system according to claim 5, wherein
    when the one event occurs, the display control controls display of the posted information corresponding to the one event, at a location corresponding to the one event.

8. The information-processing system according to claim 1, wherein
    the prompting prompts again the user to post to the service if the repeated mistake or failure is made by the user at the same location in the virtual space for the predetermined plural number of times after posting to the service was prompted last time.

9. The information-processing system according to claim 1, further comprising
    a storage to store a user image corresponding to the user,
    wherein the posting posts, to the service, the posted information including information indicating the stored user image.

10. An information-processing apparatus comprising:
    a processing system, comprising a processor, the processing system being at least configured to:
        execute an application program;
        prompt a user to post to a service for sharing posted information in response to a repeated mistake or failure being made by a virtual character operated by the user at a same location in virtual space for a predetermined plural number of times in the executed application program; and
        post posted information corresponding to the repeated mistake or failure to the service in accordance with a user input responding to the prompt,
    wherein, for execution of the application program, the processing system is further configured to store coordinates indicating the same location in the virtual space respectively at different times where the repeated mistake or failure is made by the user at the same location in the virtual space for the predetermined plural number of times; and wherein the prompt to the user to post to the service for sharing posted information is provided upon determination that the user has made the repeated mistake or failure at the same location in the virtual space for the predetermined plural number of times.

11. An information-processing method comprising:
executing an application program;
prompting a user to post to a service for sharing posted information in response to a repeated mistake or failure being made by a virtual character operated by the user at a same location in virtual space for a predetermined plural number of times in the executed application program; and
posting posted information corresponding to the repeated mistake or failure to the service in accordance with a user input responding to the prompting,
wherein executing the program includes storing coordinates indicating the same location in the virtual space respectively at different times where the repeated mistake or failure is made by the user at the same location in the virtual space for the predetermined plural number of times; and
wherein prompting the user to post to the service for sharing posted information is provided upon determination that the user has made the repeated mistake or failure at the same location in the virtual space for the predetermined plural number of times.

12. A computer-readable non-transitory storage medium storing a program causing a computer device to execute a process, the process comprising:
executing an application program;
prompting a user to post to a service for sharing posted information in response to repeated mistake or failure being made by a virtual character operated by the user at a same location in virtual space for a predetermined plural number of times in the executed application program; and
posting posted information corresponding to the repeated mistake or failure to the service in accordance with a user input responding to the prompting,
wherein executing the program includes storing coordinates indicating the same location in the virtual space respectively at different times where the repeated mistake or failure is made by the user at the same location in the virtual space for the predetermined plural number of times; and
wherein prompting the user to post to the service for sharing posted information is provided upon determination that the user has made the repeated mistake or failure at the same location in the virtual space for the predetermined plural number of times.

13. The information-processing apparatus according to claim 10, wherein
the application program is a program for executing a plurality of events that proceed in a virtual time, and
the prompt to the user to post to the service for sharing posted information is provided if the user has made the repeated mistake or failure at the same location in the virtual space for the predetermined plural number of times within a predetermined time period in the virtual time in the executed application program.

14. The information-processing method according to claim 11, wherein
the application program is a program for executing a plurality of events that proceed in a virtual time, and
the prompting prompts the user to post to the service for sharing posted information, if the user has made the repeated mistake or failure at the same location in the virtual space for the predetermined plural number of times within a predetermined time period in the virtual time in the executed application program.

15. The computer-readable non-transitory storage medium according to claim 12, wherein
the application program is a program for executing a plurality of events that proceed in a virtual time, and
the prompting prompts the user to post to the service for sharing posted information, if the user has made the repeated mistake or failure at the same location in the virtual space for the predetermined plural number of times within a predetermined time period in the virtual time in the executed application program.

* * * * *